(12) United States Patent
Johnson

(10) Patent No.: US 10,511,340 B2
(45) Date of Patent: Dec. 17, 2019

(54) PROTECTION OF A MOBILE COMMUNICATION DEVICE

(71) Applicant: Savox Communications Oy Ab (Ltd), Espoo (FI)

(72) Inventor: Joel R. Johnson, Lincoln, NE (US)

(73) Assignee: SAVOX COMMUNICATIONS OY AB (LTD), Espoo (FI)

( * ) Notice: Subject to any disclaimer, the term of this patent is extended or adjusted under 35 U.S.C. 154(b) by 0 days.

(21) Appl. No.: 15/463,060

(22) Filed: Mar. 20, 2017

(65) Prior Publication Data

US 2018/0269916 A1 Sep. 20, 2018

(51) Int. Cl.
| | |
|---|---|
| *D06N 3/00* | (2006.01) |
| *H01B 7/06* | (2006.01) |
| *H04M 1/03* | (2006.01) |
| *H04W 4/10* | (2009.01) |
| *H04B 1/3888* | (2015.01) |

(52) U.S. Cl.
CPC ......... *H04B 1/3888* (2013.01); *D06N 3/0034* (2013.01); *H04W 4/10* (2013.01); *D06N 2201/0272* (2013.01); *D06N 2209/067* (2013.01); *D10B 2401/18* (2013.01); *D10B 2505/10* (2013.01)

(58) Field of Classification Search
CPC ...... H04B 1/3888; D06N 3/0034; H01B 7/06; H04M 1/03; H04W 4/10
See application file for complete search history.

(56) References Cited

U.S. PATENT DOCUMENTS

| | | | |
|---|---|---|---|
| 6,179,666 B1* | 1/2001 | Osborn | H04B 1/385 439/669 |
| 6,287,686 B1* | 9/2001 | Huang | A41D 31/0022 428/362 |
| 8,341,762 B2* | 1/2013 | Balzano | A41D 1/005 2/102 |
| 2008/0242383 A1* | 10/2008 | Towns | H04B 1/3888 455/575.8 |
| 2013/0190052 A1* | 7/2013 | Lundell | H04M 1/0262 455/566 |
| 2015/0057055 A1* | 2/2015 | Torregrossa | H04B 1/3888 455/575.8 |
| 2016/0362584 A1* | 12/2016 | Quinn | C09J 7/041 |

* cited by examiner

*Primary Examiner* — Nguyen T Vo
(74) *Attorney, Agent, or Firm* — Young & Thompson

(57) ABSTRACT

According to an example embodiment, an arrangement is provided, the arrangement including a mobile communication device including a terminal device for wireless communication with one or more other devices via a communication channel, and a fire retardant sleeve having a shape and size that enable accommodating the mobile communication device therein, wherein at least part of the mobile communication device is enclosed within the fire retardant sleeve.

17 Claims, 1 Drawing Sheet

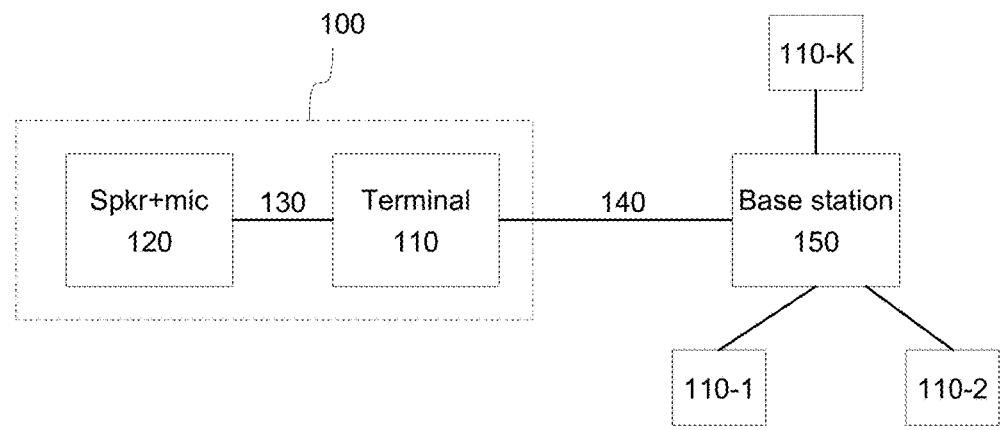

PROTECTION OF A MOBILE COMMUNICATION DEVICE

TECHNICAL FIELD

The present invention relates to an arrangement that facilitates use of a mobile communication device in challenging operating conditions, such as conditions where mobile communication device may be exposed to extreme heat, to a flame and/or to hazardous or otherwise harmful substances.

BACKGROUND

Communication equipment frequently carried by e.g. firefighters, rescue workers, policemen or medical personnel are in many occasions exposed to challenging operation conditions that may involve exposure to high temperatures, to fire, to harmful chemicals or fumes, etc. If not properly accounted for, such operating conditions may result in malfunction or even damage of the communication equipment. Moreover, even if the communication equipment survives such operating conditions without irrecoverable damage, thorough clean-up of the communication equipment is typically required after such use to ensure continuous and safe operation of the communication equipment. However, both such use in extreme operating conditions and the clean-up procedures required thereafter contribute towards shortening the life-time of the communication equipment.

SUMMARY

Therefore, it is an object of the present invention to provide a technique for protecting communication equipment in extreme operating conditions such that it facilitates both faultless operation of the communication equipment in such operating conditions and convenient clean-up procedure after use in such operating conditions.

Such technique is provided via an arrangement and a method defined in the respective independent claims.

According to an example embodiment, an arrangement is provided, the arrangement comprising a mobile communication device comprising a terminal device for wireless communication with one or more other devices via a communication channel, and a fire retardant sleeve having a shape and size that enable accommodating the mobile communication device therein, wherein at least part of the mobile communication device is enclosed within the fire retardant sleeve.

According to an example embodiment, a method for protecting a mobile communication device for wireless communication is provided, the method comprising enclosing at least part of the mobile communication device inside a fire retardant sleeve having a shape and size that enable accommodating the mobile communication device therein.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings.

BRIEF DESCRIPTION OF FIGURES

The embodiments of the invention are illustrated by way of example, and not by way of limitation, in the figures of the accompanying drawings, where FIG. 1 illustrates a block diagram of some elements of a mobile communication device for used in various example embodiments.

DESCRIPTION OF SOME EMBODIMENTS

Various embodiments of the present invention are provided for protecting a mobile communication device in challenging operating conditions that may involve exposure to high temperatures, to fire, to harmful chemicals or fumes, etc. in order to facilitate faultless operation of the communication equipment and a convenient clean-up procedure after use in such operating conditions. As an example, the mobile communication device may be provided for wireless communication via a professional mobile radio (PMR) system. Such a mobile communication device may be referred to as PMR terminal. The PMR terminal typically includes a terminal device and a speaker-microphone unit 120 that are communicatively connected to each other by an electric cable.

The PMR terminal may provide push to talk (PTT) operation that enables point-to-point or point-to-multipoint communication with other PMR terminals via a PMR system, where the PMR terminal connects to a base station of a PMR system via a half-duplex communication channel, which base station further connects the PMR terminal to other PMR terminals (via respective half-duplex communication channels) that are operated within coverage area of the base station. Several such PMR systems are known in the art, non-limiting examples in this regard including Terrestrial Trunked Radio (TETRA) and MPT 1327.

FIG. 1 illustrates a block diagram of the above-described elements of a PMR terminal 100, i.e. a terminal device 110, a speaker-microphone unit 120 and an electric cable 130. FIG. 2 further depicts a wireless link 140, the enables the half-duplex communication to a PMR base station 150. The PMR base station 150, which connects to other PMR terminals 100-1, 100-2, . . . , 100-K of the PMR system via respective wireless links 140-1, 140-2, . . . , 140-K that each provide a respective half-duplex communication channel between the PMR base station 150 and the respective PRM terminal 100-1, 100-2, . . . , 100-K. The PMR base station 150 may also be referred to as a PMR server or as a PTT server.

In general, the PMR terminal 100 includes a PTT button (or PTT switch) that enables switching between a transmission mode and a reception mode, i.e. such that when the PTT button is pushed (and held) the PMR terminal 100 is in the transmission mode and when the PTT button is not pushed (e.g. it is released) the PMR terminal 100 is in the reception mode. The PTT operation principle in general is well known in the art and therefore it is not described in further detail in this disclosure. Due to the PTT operation, the PMR terminal 100 may be also referred to as a PTT terminal 100.

PMR terminals (PTT terminals) like the PMR terminal 100 are typical in professional use by professional personnel such as firefighters, rescue workers, policemen, medical personnel, military personnel, etc., while PMR terminals also find recreational use by general public.

The terminal device 110 enables a half-duplex voice communication channel to the PMR base station 150 over the wireless link 140 and enables PTT operation according to a suitable PMR technology known in the art, e.g. the TETRA or MPT 1327 mentioned in the foregoing. However, exact characteristics of the radio technology employed to enable the wireless link 140, exact details of the PTT operation or protocol and/or other details of the employed PMR technology are not material to various embodiments according to the present invention and therefore these aspects are not described in further detail in the present disclosure.

Typically, the speaker-microphone unit 120 comprises a single microphone and a single speaker. However, in general the speaker-microphone unit 120 may comprise one or more microphones and one or more speakers, depending on the design and intended usage scenario of the PMR terminal 100. The speaker-microphone unit 120 typically also comprises a user interface comprising the PTT button that enables switching between a transmission mode and a reception mode. The user interface of the speaker-microphone unit 120 may further comprise other user interface elements that facilitate convenient use of the PMR terminal 100. Examples in this regard include one or more further buttons or switches that enable controlling some aspects of operation of the PMR terminal 100, such as volume control and/or channel selection. A further example in this regard is an electronic display for displaying information concerning the operation of the PMR terminal 100, such as an indication of the currently employed channel, an indication of the current volume level, an indication of the strength of a radio connection between the PMR terminal 100 and the PMR base station 150, an indication of charge level of the battery that supplies operating power to the PMR terminal 100, etc. Since the speaker-microphone unit 120 is provided as a separate physical entity from the user terminal 110, it may also be referred to as a remote speaker-microphone unit 120.

The electric cable 130 that connects the user terminal 110 and the speaker-microphone unit 120 comprises one or more electric wires that enable transfer of electrical signals between the user terminal 110 and the speaker-microphone unit 120. Such electrical signals may comprise audio signals and/or control signals. As a particular example, these audio signals may include uplink audio signals transferred from the speaker-microphone unit 120 to the terminal device 110 for transmission via the wireless link 140 and via the base station 150 to other PMR terminals and/or the audio signals may include downlink audio signals received by the terminal device 110 from the base station 150 and transferred from the terminal device 110 to the speaker-microphone unit 120. The control signals may include, for example, a signal indicative of the state (or position) of the PTT button transferred from the speaker-microphone unit 120 to the terminal device 110, a signal indicative of a channel selection transferred between the speaker-microphone unit 120 and the terminal device 110, a signal indicative of the current battery charge level transferred from the terminal device 110 to the speaker-microphone unit 120, etc.

In an example, the electric cable 130 comprises a coiled cable. In this regard, the electric cable 130 may be provided as a cable that is coiled over its full length or substantially over its full length (e.g. such that the cable is coiled apart from short segments in both ends that enable connecting the electric cable 130 to the terminal device 110 and the speaker-microphone arrangement 120). Alternatively, the electric cable 130 may be provided as a cable that includes one or more coiled portions together with one or more uncoiled portions. Temporarily (at least) partial uncoiling a coiled portion the electric cable 130 enables extending the length of the electric cable 130 from its 'resting' length (coiled length) for convenient use in various operating conditions by simply pulling the cable, while the coiled portion of the electric cable 130 autonomously retracts to its 'resting' length (coiled length) when no longer being pulled.

According to various embodiments of the present invention, at least part of the PMR terminal 110 is enclosed inside a fire retardant sleeve for use in field conditions (e.g. by a firefighter). In this regard, the fire retardant sleeve is designed such that it fully or substantially fully encloses selected elements of the PMR terminal 100. In an example, the fire retardant sleeve is designed to enclose the speaker-microphone unit 120 and the electric cable 130, whereas the terminal device 110 is left without protection by the fire retardant sleeve (but it may be placed e.g. inside protective gear worn by a user of the PMR terminal 100 for protection against harsh environmental conditions). In another example, all main elements of the PMR device 100 described in the foregoing are enclosed inside the fire retardant sleeve, i.e. the user terminal 110, the speaker-microphone unit 120 and the electric cable 130, the fire retardant sleeve thereby providing a 'stand-alone' protection for the communication device 110.

The fire retardant sleeve enables enclosing therein, disclosing therefrom and re-enclosing therein at least some of the elements of the communication device 100. In this regard, the fire retardant sleeve is provided with closing mechanism such as a Velcro strap arrangement, a zipper arrangement, etc. that enables enclosing, disclosing and re-enclosing the selected elements of communication device 110 according to the current user preference or need.

In general, the fire retardant sleeve is made of flexible material, for example fire retardant cloth or a non-fire retardant cloth with one or more layers of fire retardant coating on its exterior. Flexibility of the fire retardant sleeve enables operating at least some elements of the user interface of speaker-microphone unit 120 through the fire retardant sleeve. The fire retardant sleeve has a shape and size that enable accommodating the PMR terminal 100 inside the fire retardant sleeve while enabling access to said at least some elements of the user interface of the speaker-microphone unit 120 and that enables positioning the speaker-microphone unit 120 at various positions with respect to the terminal device 110.

The fire retardant sleeve may include respective sleeve portions that are designed to protect corresponding elements of the PMR terminal 100. In this regard, such sleeve portions may have a size and shape that matches or substantially matches corresponding elements of the PMR terminal 100 such that they follow or substantially follow the physical outline of the respective the PMR terminal 100 when the PMR terminal 100 is enclosed within the fire retardant sleeve. In case the electric cable 130 comprises a coiled cable (as described in the foregoing), the fire retardant sleeve in general and/or a respective sleeve portion that serves to protect the electric cable 130 has a shape and size that enable at least partially extending the coiled cable from its 'resting' length.

The fire retardant sleeve is made of or it comprises material that allows sound to travel therethrough at no or substantially no degradation in a frequency range that represents important frequency components of human voice, e.g. a frequency range from 50 Hz to 3.5 kHz. As a particular example, at least a sleeve portion that serves to protect the speaker-microphone unit 120 may be made of material having such sound transfer characteristics, where one or more other sleeve portions may be made of material having different characteristics with respect to sound transfer therethrough.

The fire retardant sleeve is made of or it comprises material that allows radio waves to travel therethrough at no or substantially no degradation in a frequency range employed for radio communication with other devices (e.g. with the PMR base station 150) over the wireless link 140. In particular, at least a sleeve portion that serves to protect the terminal device 110 or part of the terminal device 110 that hosts an antenna may be made of material having such radio wave transfer characteristics, where one or more other sleeve portions may be made of material having different characteristics with respect to transfer of radio waves therethrough.

The fire retardant sleeve may provide fire protection to a desired extent; it may be fire-resistant to a predefined extent or it may be completely fireproof. The required and/or desired extent of fire protection provided by the fire retardant sleeve typically requires on its intended application and hence a suitable fire retardant sleeve may be provided or selected in accordance to the current need. Examples of suitable material include textiles (or cloth) made of aramid fibers and textiles comprising aramid fibers. In particular, such aramid fibers may comprise meta-aramid fibers or a combination of meta-aramid fibers and para-aramid fibers. As a particular but non-limiting example, the fire retardant sleeve may be made of a fiber developed by DuPont (E.I. du Pont de Nemours and Company) known as Nomex®.

Advantages of using the fire retardant sleeve for enclosing the PMR terminal 100 for usage scenarios with a risk of extreme heat and/or exposure to a flame and/or hazardous substances include the following:

Using the fire retardant sleeve to enclose the PMR terminal 100 that as such is not designed to tolerate such extreme conditions extends usability of such terminals also for such usage scenarios.

Looking the previous bullet-point from another angle, using the fire retardant sleeve to enclose the PMR terminal 100 for such usage scenarios further serves to avoid designing the PRM terminal 100 itself to tolerate such extreme conditions, which typically enables more straightforward and/or more affordable manufacturing process.

In case the electric cable 130 of the PMR terminal 100 comprises a coiled cable, using the fire retardant sleeve as protection measure against heat and flame facilitates the electric cable 130 to maintain its coiling and uncoiling properties, whereas e.g. coating the electric cable 130 with one or more layers of a fire retardant material typically degrades the capability of the coiled portion of the electric cable 130 to stay coiled.

Usage of the fire retardant sleeve to enclose the PMR terminal 100 for field use enables convenient cleaning process that may be required after use in conditions where exposure to smoke, fumes and hazardous chemicals has taken place: it is typically sufficient to simply disclose the PMR terminal 100 from the fire retardant sleeve and wash or otherwise clean the fire retardant sleeve only.

While various example embodiments of the present invention are described in the foregoing by using the PMR terminal 100 as an example, these example embodiments readily generalize to mobile communication devices of other type and/or different characteristics or structure. As an example in this regard, the PMR terminal enclosed within the fire retardant sleeve may be provided without the speaker-microphone unit 120 and the electric cable 130 such that the functions and elements (e.g. the one or more speakers, the one or more microphones, the PTT button) described in the foregoing as elements of the speaker-microphone unit 120 are provided as respective elements of the terminal device 110. In another example, in addition to or instead of the previous example, the fire retardant sleeve may be employed to enclose a mobile communication device that communicates with other communication devices using technology different from PMR and/or PTT, e.g. a cellular phone or a radiotelephone different from a PMR terminal 100.

Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not.

The invention claimed is:

1. An arrangement comprising a mobile communication device comprising:
    a terminal device configured for wireless communication with one or more other devices via a communication channel;
    a speaker-microphone unit;
    an electric cable that comprises a coiled cable that comprises at least one coiled portion,
        wherein the terminal device and the speaker-microphone unit are configured to be communicatively coupled to each other by the electric cable; and
    a fire retardant sleeve having a shape and size that enable accommodating said speaker-microphone unit and said electric cable therein,
        wherein said fire retardant sleeve is made of one of the following: a fire retardant cloth made of fire retardant material, a cloth coated with, on its exterior, one or more layers of fire retardant coating,
        wherein said speaker-microphone unit and said electric cable are entirely enclosed within said fire retardant sleeve,
        wherein the fire retardant sleeve comprises a one-piece structure,
        wherein said fire retardant sleeve provides stand-alone protection, separate from protective gear worn by a user of the communication device, and
        wherein the sleeve comprises respective sleeve portions that are sized and shaped to match or substantially match the speaker-microphone unit and the electrical cable of the mobile communication device.

2. An arrangement according to claim 1, wherein said terminal device is enclosed within said fire retardant sleeve.

3. An arrangement according to claim 2, wherein said fire retardant sleeve is made of flexible material and it has a shape and size that enable positioning the speaker-microphone unit in various positions with respect to the terminal device.

4. An arrangement according to claim 2, wherein said fire retardant sleeve is made of flexible material that enables operating at least one element of a user interface of the mobile communication device through said fire retardant sleeve.

5. An arrangement according to claim 1, wherein said fire retardant sleeve is made of flexible material and it has a shape and size that enable positioning the speaker-microphone unit in various positions with respect to the terminal device.

6. An arrangement according to claim 5, wherein said fire retardant sleeve is made of flexible material that enables operating at least one element of a user interface of the mobile communication device through said fire retardant sleeve.

7. An arrangement according to claim 1, wherein said fire retardant sleeve is made of flexible material that enables operating at least one element of a user interface of the mobile communication device through said fire retardant sleeve.

8. An arrangement according to claim 7, wherein said fire retardant sleeve is made of flexible material that enables operating at least one element of a user interface of the mobile communication device through said fire retardant sleeve.

9. An arrangement according to claim 1, wherein the said fire retardant sleeve comprises a textile that comprises aramid fibers.

10. An arrangement according to claim 9, wherein said aramid fibers comprise one of the following:
   meta-aramid fibers,
   a combination of meta-aramid fibers and para-aramid fibers.

11. An arrangement according to claim 1, wherein the said fire retardant sleeve is made of a textile comprising aramid fibers.

12. An arrangement according to claim 1, wherein said fire retardant sleeve is provided with a closing mechanism that enables the following:
   disclosing the at least part of the mobile communication device from said fire retardant sleeve, and
   enclosing the at least part of the mobile communication device within said fire retardant sleeve.

13. An arrangement according to claim 1, wherein the mobile communication device is arranged to provide push-to-talk, PTT, operation in a professional mobile radio, PMR system.

14. An arrangement according to claim 1, wherein said fire retardant sleeve provides stand-alone protection for the communication device and is sized and shaped to match or substantially match the mobile communication device.

15. A method for protecting a mobile communication device, the mobile communication device comprising a terminal device for wireless communication, a speaker-microphone unit, and a coiled electric cable communicatively coupling the terminal device to the speaker-microphone unit, the method comprising enclosing at least part of the mobile communication device inside a fire retardant sleeve having a shape and size that enable accommodating said speaker-microphone unit and said coiled electric cable therein,
   wherein said speaker-microphone unit and said coiled electric cable are entirely enclosed within said fire retardant sleeve,
   wherein the fire retardant sleeve comprises a one-piece structure,
   wherein said fire retardant sleeve is made of one of the following: a fire retardant cloth made of fire retardant material, a cloth coated with, on its exterior, one or more layers of fire retardant coating,
   wherein said fire retardant sleeve provides stand-alone protection, separate from protective gear worn by a user of the communication device, and
   wherein the sleeve comprises respective sleeve portions that are sized and shaped to match or substantially match the speaker-microphone unit and the electrical cable of the mobile communication device.

16. An arrangement according to claim 15, wherein said fire retardant sleeve is made of flexible material and it has a shape and size that enable positioning the speaker-microphone unit in various positions with respect to the terminal device.

17. An arrangement according to claim 15, wherein said fire retardant sleeve is made of flexible material that enables operating at least one element of a user interface of the mobile communication device through said fire retardant sleeve.

* * * * *